(12) United States Patent
Shi

(10) Patent No.: US 8,095,188 B2
(45) Date of Patent: Jan. 10, 2012

(54) WIRELESS EARPHONE AND PORTABLE ELECTRONIC DEVICE USING THE SAME

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 391 days.

(21) Appl. No.: 12/487,738

(22) Filed: Jun. 19, 2009

(65) Prior Publication Data
US 2009/0325649 A1 Dec. 31, 2009

(30) Foreign Application Priority Data
Jun. 27, 2008 (CN) .......................... 2008 1 0302408

(51) Int. Cl.
*H04M 1/00* (2006.01)
*H04K 3/00* (2006.01)
(52) U.S. Cl. .................. 455/569.1; 455/575.2; 379/431; 381/381

(58) Field of Classification Search ............... 455/569.1, 455/575.2; 379/431, 433.01; 381/381
See application file for complete search history.

(56) References Cited

U.S. PATENT DOCUMENTS

| | | | | |
|---|---|---|---|---|
| 5,771,438 | A | * | 6/1998 | Palermo et al. ............ 455/41.1 |
| 2004/0185919 | A1 | * | 9/2004 | Yoo ............................ 455/575.1 |
| 2005/0107131 | A1 | * | 5/2005 | Abramov ................... 455/569.1 |

* cited by examiner

*Primary Examiner* — Lee Nguyen
(74) *Attorney, Agent, or Firm* — Altis Law Group, Inc.

(57) ABSTRACT

A wireless earphone includes an earphone, a microphone, a hanging portion and an adjusting portion fixed with the hanging portion. The answering portion is mounted on the junction area of the hanging portion and the adjusting portion. The microphone is mounted on the other end of the adjusting portion. The wireless earphone is made of flexible, elastic material. The bluetooth has at least one block protruding thereon, to make the wireless earphone be disassembly mounted on a portable electronic device. The invention also includes a portable electronic device using the wireless earphone.

19 Claims, 3 Drawing Sheets

WIRELESS EARPHONE AND PORTABLE ELECTRONIC DEVICE USING THE SAME

CROSS-REFERENCE TO RELATED APPLICATIONS

This application is related to co-pending U.S. patent application Ser. No. 12/487,736, both entitled "WIRELESS EARPHONE AND PORTABLE ELECTRONIC DEVICE USING THE SAME". Such application has the same assignee as the present application. The above-identified application is incorporated herein by reference.

BACKGROUND

1. Technical Field

The exemplary disclosure generally relates to a wireless earphone and a portable electronic device with the wireless earphone.

2. Description of Related Art

With the development of wireless communication and information processing technologies, portable electronic devices such as mobile phones and personal digital assistants (PDAs) are now in widespread use, and consumers may now enjoy the full convenience of high technology products almost anytime and anywhere. Wireless earphones such as based on BLUETOOTH technology are widely used with these portable electronic devices facilitating convenient hands free communication.

However, the conventional wireless earphone is usually an separate component from the portable electronic devices such as mobile phone, personal digital assistant and etc. Therefore, the wireless earphone may not be carried at all time with the portable electronic device. Because of the small volume of the wireless earphone, the wireless earphone may easily be lost.

When using the wireless earphone, it is often hung on the user's ear, after long time using the wireless earphone, it may cause discomfort to the users.

Therefore, there is room for improvement within the art.

BRIEF DESCRIPTION OF THE DRAWINGS

Many aspects of the wireless earphone and portable electronic device with the wireless earphone be better understood with reference to the following drawings. These drawings are not necessarily drawn to scale, the emphasis instead being placed upon clearly illustrating the principles of the present wireless earphone and portable electronic device with the wireless earphone. Moreover, in the drawings like reference numerals designate corresponding sections throughout the several views.

DETAILED DESCRIPTION

Figure 1:
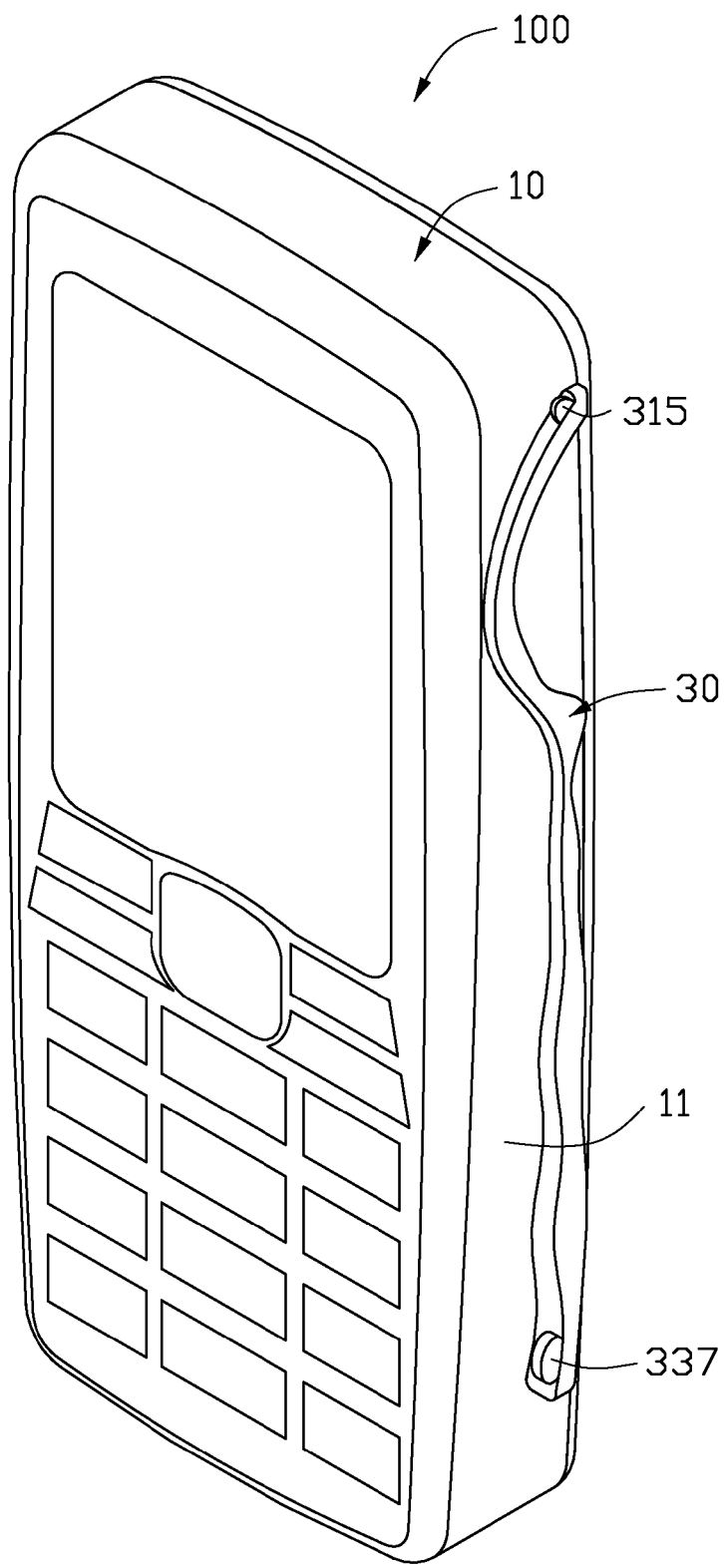
FIG. 1 shows a perspective view of a portable electronic device with wireless earphone mounted thereon, in accordance with an exemplary embodiment of the present invention.
Figure 2:
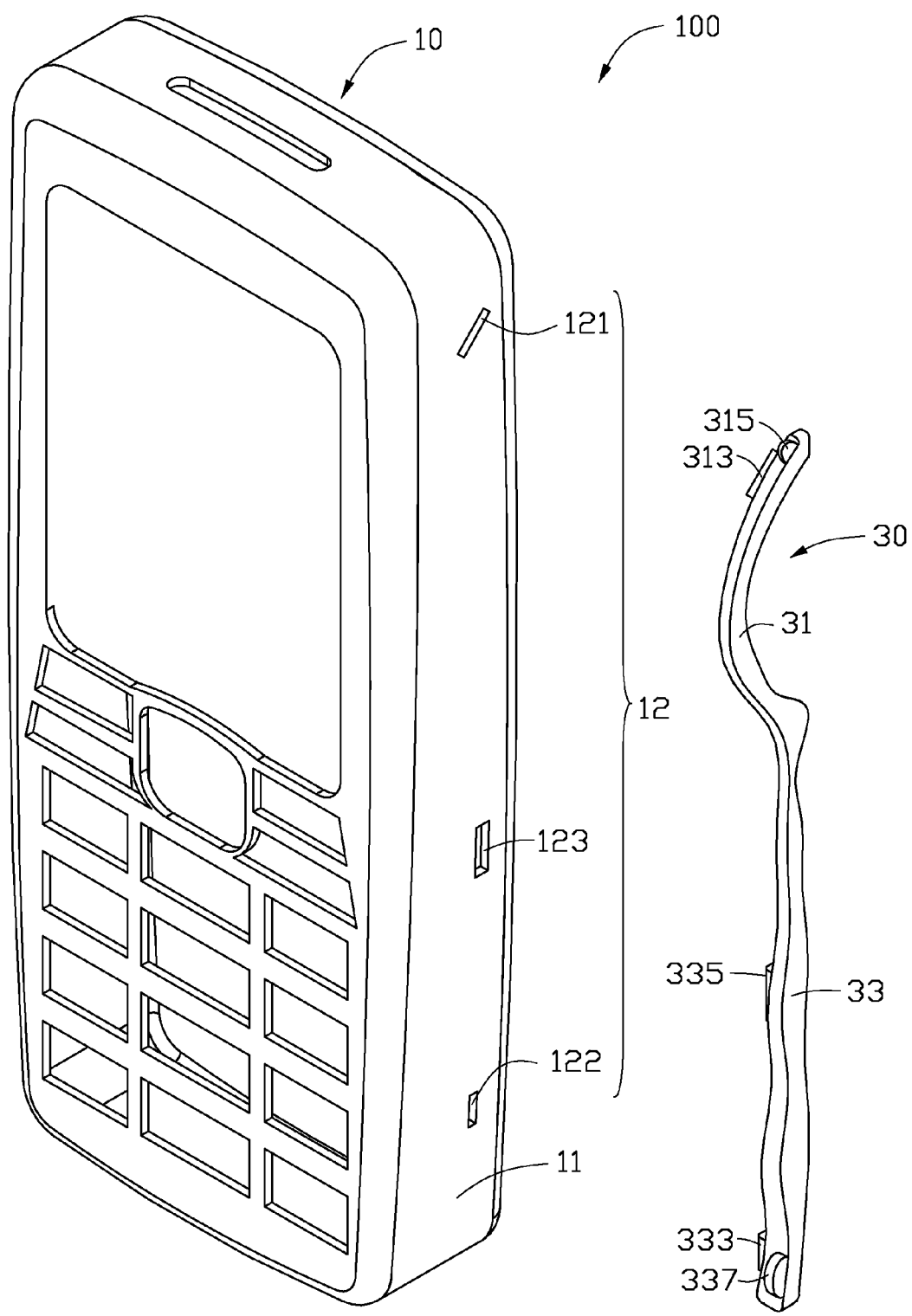
FIG. 2 shows a perspective view of the portable electronic device with the wireless earphone detached apart therefrom, in accordance with an exemplary embodiment of the present invention shown in FIG. 1.

FIG. 1 and FIG. 2 show an exemplary portable electronic devices, such as mobile phone terminals, personal digital assistant and etc, with wireless earphone. The portable electronic device 100 includes a body 10 and a wireless earphone 30 such as based on BLUETOOTH technology, detachably assembled with the body 10.

The body 10 can be a mobile phone or a personal digital assistant. The body 10 includes a longitudinal sidewall 11. The sidewall 11 defines an assembling portion 12 thereon so as to assemble the wireless earphone 30 on the body 10. In the present embodiment, the assembling portion 12 includes a first latching slot 121, a second latching slot 122 and a third latching slot 123. The first latching slot 121, the second latching slot 122 and the third latching slot 123 are recessed from the sidewall 11 and longitudinally spaced apart from each other.

Figure 3:
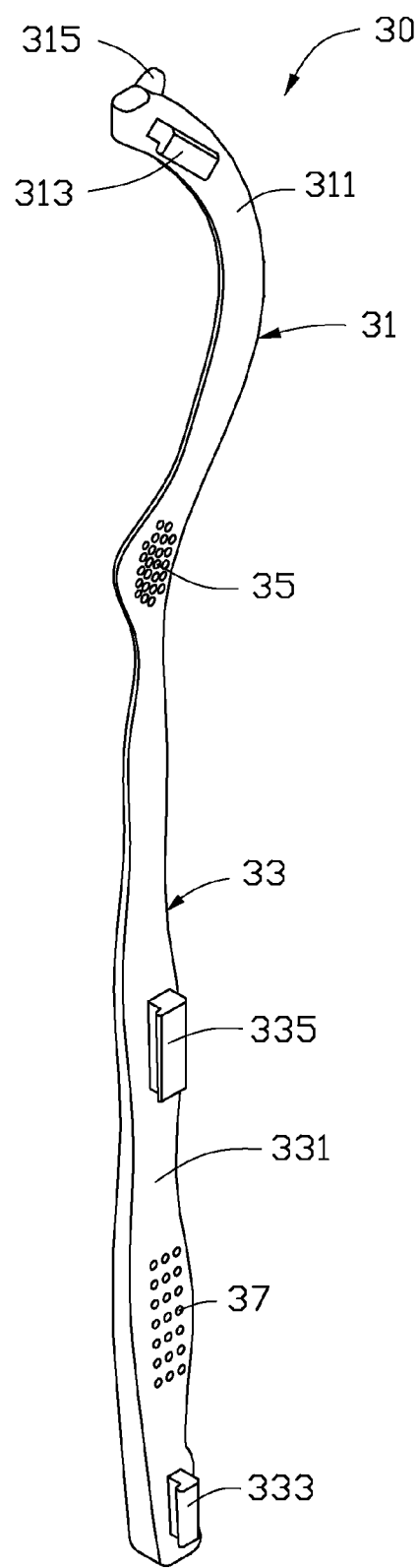
FIG. 3 shows a perspective view of the wireless earphone of the portable electronic device, in accordance with an exemplary embodiment of the present invention.

Referring to FIG. 3, the wireless earphone 30 is a substantially bent strip made of flexible elastic material. The wireless earphone 30 may be bent and flexed to adjust the relative distance between the wireless earphone 30 and the ear of the user. The wireless earphone 30 includes a hanging portion 31, an adjusting portion 33, an earphone 35 and a microphone 37. The hanging portion 31 is substantially arc-shaped strip and connects with the adjusting portion 33. The hanging portion 31 includes an operating surface 311, a first block 313 and a protrusion 315. The first block 313 is disposed at the end of the hanging portion 31 corresponding to the first latching slot 121. The first block 313 protrudes from the operating surface 311 with substantially L-shaped cross-section. The protrusion 315 is disposed at the end of the hanging portion 31 adjacent to the first block 313, and configured to detach the hanging portion 31 of the wireless earphone 30 from first latching slot 121 conveniently.

The adjusting portion 33 is substantially bar strip shaped, and has a working surface 331 parallel and at the same plane with the operating surface 311 of the hanging portion 31. The adjusting portion 33 includes a second block 333 and a third block 335 separately disposed at the working surface 331 thereof. In the present embodiment, the adjusting portion 33 connects with the hanging portion 31 at one end, and the second block 333 is disposed at the opposite end corresponding to the second latching slot 122 of the body 10. The third block 335 is disposed at substantially middle portion of the adjusting portion 33 corresponding to the third latching slot 123. The adjusting portion 33 further includes a projection 337 disposed at the end thereof adjacent to the second block 333, and configured to detach the adjusting portion 33 of the wireless earphone 30 from the second latching slot 122 conveniently.

The earphone 35 is disposed at the junction section of the hanging portion 31 and the adjusting portion 33. The microphone 37 is disposed on the working surface 331 of the adjusting portion 31 adjacent to the second block 333.

When the wireless earphone 30 is not in use, the wireless earphone 30 is detachably mounted on the sidewall 11 of the body 10, with the first block 313, the second block 333 and the third block 335 latching with the first latching slot 121, the second latching slot 122 and the third latching slot 123 of the sidewall 11 of the body 10, respectively. When using the wireless earphone 30, the earphone 30 is taken out of the body 10 by the protrusion 315 and the projection 337. The wireless earphone is mounted on one ear of the user. The adjusting portion 33 of the wireless earphone 30 is bent and adjust to make the microphone 37 locate adjacent the mouth of the user.

It is to be understood that the assembling portion 12 may be an arcuate groove recessed from the sidewall 11 of the body 10.

It is to be understood that the hanging portion 31 of the wireless earphone 30 may be produce by one-mold molding method with plastic material, such as polyvinylchloride (PVC) resin, polypropylene resin, polyethylene resin, polyethylene terephthalate (PET) resin, polycarbonate (PC), nylon resin, polyvinyl formal resin, alkyd resin, polyimide resin and etc.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A wireless earphone comprising:
a hanging portion configured for being hung on one ear of the user, the hanging portion comprising a protrusion disposed at the end thereof;
at least one block disposed on the hanging portion;
an adjusting portion connecting with the hanging portion and being configured for adjusting the relative distance between the adjusting portion and the hanging portion;
an earphone disposed at the junction area of the hanging portion and the adjusting portion to answer the incoming call; and
a microphone disposed on the adjusting portion spaced apart from the earphone.

2. The wireless earphone as claimed in claim 1, wherein the hanging portion is substantially arc-shaped and includes a first block disposed thereon.

3. The wireless earphone as claimed in claim 2, wherein the hanging portion of the wireless earphone may be produced by one-mold molding method with plastic material.

4. The wireless earphone as claimed in claim 2, wherein the adjusting portion is substantially bar-shaped and includes a second block disposed thereon.

5. The wireless earphone as claimed in claim 4, wherein the adjusting portion further includes a third block disposed thereon spaced apart from the second block.

6. The wireless earphone as claimed in claim 5, wherein the adjusting portion includes a working surface, the second block disposed at the end of the adjusting portion protruding from the working surface thereof.

7. The wireless earphone as claimed in claim 6, wherein the adjusting portion further includes a projection disposed at the end thereof adjacent to the second block to detach the wireless earphone from a portable electronic device.

8. The wireless earphone in claim 5, wherein the third block is disposed at the substantially middle portion of the adjusting portion.

9. The wireless earphone as claimed in claim 4, wherein the second block has an L-shaped cross-section.

10. A portable electronic device, comprising:
a body comprising a sidewall; and
a wireless earphone detachably mounted on the sidewall of the body, the wireless earphone comprising:
a hanging portion configured for being hung on one ear of the user, the hanging portion comprising a protrusion disposed at the end thereof;
an adjusting portion connecting with the hanging portion and being configured for adjusting the relative distance between the adjusting portion and the hanging portion;
an earphone disposed at the junction area of the hanging portion and the adjusting portion to answer the incoming call; and
a microphone disposed on the adjusting portion spaced apart from the earphone.

11. The portable electronic device as claimed in claim 10, wherein the sidewall of the body further includes an assembling portion disposed thereon, the wireless earphone further includes at least one block disposed thereon for detachably assembling with the body.

12. The portable electronic device as claimed in claim 11, wherein the assembling portion includes a first latching slot recessed from the sidewall of the body, the hanging portion is substantially arc-shaped and includes a first block disposed thereon corresponding to the first latching slot.

13. The portable electronic device as claimed in claim 12, wherein the adjusting portion is substantially bar-shaped and includes a second block and a third block spaced apart disposed thereon; the assembling portion further includes a second latching slot and a third latching slot space apart recessed from the sidewall longitudinally corresponding to the second latching slot and the third latching slot respectively.

14. The portable electronic device as claimed in claim 13, wherein adjusting portion includes a working surface, the second block disposed at the end of the adjusting portion protruding from the working surface thereof; the third block is disposed at the substantially middle portion of the adjusting portion.

15. The portable electronic device as claimed in claim 14, wherein the adjusting portion further includes a projection disposed at the end thereof adjacent to the second block to detach the wireless earphone conveniently.

16. The portable electronic device as claimed in claim 11, wherein the assembling portion may be an arcuate groove recessed from the sidewall of the body.

17. The portable electronic device as claimed in claim 10, wherein the hanging portion of the wireless earphone may be produce by one-mold molding method with plastic material.

18. The portable electronic device as claimed in claim 10, wherein the body is a mobile phone or a personal digital assistant.

19. A wireless earphone comprising:
a hanging portion configured for being hung on one ear of the user;
at least one block disposed on the hanging portion;
an adjusting portion connecting with the hanging portion and being configured for adjusting the relative distance between the adjusting portion and the hanging portion, the adjusting portion comprising a projection disposed at the end thereof;
an earphone disposed at the junction area of the hanging portion and the adjusting portion to answer the incoming call; and
a microphone disposed on the adjusting portion spaced apart from the earphone.

* * * * *